US008103285B2

(12) United States Patent
Kalhan

(10) Patent No.: US 8,103,285 B2
(45) Date of Patent: Jan. 24, 2012

(54) APPARATUS, SYSTEM AND METHOD FOR DETERMINING A GEOGRAPHICAL LOCATION OF A PORTABLE COMMUNICATION DEVICE

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 1198 days.

(21) Appl. No.: 11/737,661

(22) Filed: Apr. 19, 2007

(65) Prior Publication Data

US 2008/0261615 A1    Oct. 23, 2008

(51) Int. Cl.
*H04W 24/00* (2009.01)

(52) U.S. Cl. .................. 455/456.1; 455/404.2; 370/328; 370/338

(58) Field of Classification Search ............... 455/456.1, 455/404.2; 370/328, 338
See application file for complete search history.

(56) References Cited

U.S. PATENT DOCUMENTS

| | | | |
|---|---|---|---|
| 4,737,978 A | 4/1988 | Burke et al. | |
| 5,208,756 A | 5/1993 | Song | |
| 5,293,645 A | 3/1994 | Sood | |
| 6,011,974 A | 1/2000 | Cedervall et al. | |
| 6,434,367 B1 | 8/2002 | Kumar et al. | |
| 6,965,585 B2 | 11/2005 | Grill et al. | |
| 6,990,324 B2 | 1/2006 | Laroia et al. | |
| 7,019,663 B2 * | 3/2006 | Sharony | 340/825.49 |
| 7,050,819 B2 | 5/2006 | Schwengler et al. | |
| 7,167,712 B2 | 1/2007 | Ogino et al. | |
| 7,286,834 B2 | 10/2007 | Walter | |
| 7,433,673 B1 | 10/2008 | Everson et al. | |
| 7,610,049 B2 | 10/2009 | Watanabe | |
| 2003/0118015 A1 | 6/2003 | Gunnarsson et al. | |
| 2004/0051664 A1 | 3/2004 | Frank | |
| 2004/0090937 A1 | 5/2004 | Chaskar et al. | |
| 2004/0116133 A1 | 6/2004 | Kalhan et al. | |
| 2004/0198220 A1 | 10/2004 | Whelan et al. | |
| 2005/0059400 A1 | 3/2005 | Jagadeesan et al. | |
| 2005/0090277 A1 | 4/2005 | Islam et al. | |
| 2005/0197132 A1 | 9/2005 | Lee et al. | |
| 2005/0237963 A1 | 10/2005 | Storm | |

(Continued)

FOREIGN PATENT DOCUMENTS

EP    0504122    9/1992

(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.

(Continued)

*Primary Examiner* — Nghi Ly

(57) ABSTRACT

A wireless access point receives a reverse link (RL) wireless wide area network (WWAN) signals from a wireless communication device and forwards wireless local area network (WLAN) location information related to the received RL WWAN signal to a position determining entity (PDE). The PDE uses the WLAN location information and, in some cases, other location information to determine the geographical location of the wireless communication device. The WLAN location information is any information that at least assists the PDE in determining the geographical location of the wireless communication device and may include any combination of data related to signal strength of the WWAN RL signal, a propagation time of WWAN RL signal, a distance between the access point and the wireless access point, a geographical location of the access point, and/or a geographical location of the wireless communication device.

22 Claims, 5 Drawing Sheets

U.S. PATENT DOCUMENTS

| | | |
|---|---|---|
| 2005/0282494 A1 | 12/2005 | Kossi et al. |
| 2006/0025138 A1 | 2/2006 | Kotzin |
| 2006/0040656 A1 | 2/2006 | Kotzin |
| 2006/0056448 A1 | 3/2006 | Zaki et al. |
| 2006/0114885 A1 | 6/2006 | Baek et al. |
| 2006/0121916 A1 | 6/2006 | Aborn et al. |
| 2006/0268902 A1 | 11/2006 | Bonner |
| 2007/0002813 A1 | 1/2007 | Tenny et al. |
| 2007/0010261 A1 | 1/2007 | Dravida et al. |
| 2007/0021127 A1 | 1/2007 | Zheng |
| 2007/0049276 A1 | 3/2007 | Rimoni et al. |
| 2007/0104139 A1 | 5/2007 | Marinier et al. |
| 2007/0121560 A1* | 5/2007 | Edge ............................. 370/338 |
| 2007/0140190 A1 | 6/2007 | Rensburg et al. |
| 2007/0149211 A1 | 6/2007 | Dunn et al. |
| 2007/0177530 A1 | 8/2007 | Ando et al. |
| 2007/0184845 A1 | 8/2007 | Troncoso |
| 2007/0254620 A1 | 11/2007 | Lindqvist et al. |
| 2008/0130555 A1 | 6/2008 | Kalhan |
| 2008/0130596 A1 | 6/2008 | Kalhan |
| 2008/0130597 A1* | 6/2008 | Kalhan ........................ 370/338 |
| 2008/0130598 A1 | 6/2008 | Kalhan |
| 2008/0153497 A1 | 6/2008 | Kalhan |
| 2008/0311927 A1 | 12/2008 | Boman et al. |
| 2009/0213819 A1 | 8/2009 | Kalhan et al. |
| 2009/0215400 A1 | 8/2009 | Chang et al. |

FOREIGN PATENT DOCUMENTS

| | | |
|---|---|---|
| EP | 1816888 | 8/2007 |
| EP | 1986341 | 10/2008 |
| JP | 07-154848 | 6/1995 |
| JP | 2005-110314 | 4/2005 |
| WO | WO 98/19474 | 5/1998 |
| WO | WO 02/054820 | 7/2002 |
| WO | WO 2004/002051 | 12/2003 |
| WO | WO 2004/054153 | 6/2004 |
| WO | WO 2004/057815 | 7/2004 |
| WO | WO 2004/084463 | 9/2004 |
| WO | WO 2005/076639 | 8/2005 |
| WO | WO 2007/064822 | 6/2007 |
| WO | WO 2008/066926 | 6/2008 |
| WO | WO 2008/066927 | 6/2008 |
| WO | WO 2008/066928 | 6/2008 |
| WO | WO 2008/066929 | 6/2008 |
| WO | WO 2008/091412 | 7/2008 |
| WO | WO 2009/067700 | 5/2009 |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holman and Edward G. Tiedemann Jr., "CDMA Intersystem Operations", 1994 IEEE 44th Vehicular Technology Conference, Jun. 8, 1994. pp. 590-594, Stockholm Sweden.

* cited by examiner

APPARATUS, SYSTEM AND METHOD FOR DETERMINING A GEOGRAPHICAL LOCATION OF A PORTABLE COMMUNICATION DEVICE

TECHNICAL FIELD

The invention relates in general to wireless communication systems and more specifically to determining a geographical location of a wireless communication device.

BACKGROUND

Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 300 feet per base station. Base stations in WLANs are typically referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. It is often necessary or advantageous to determine a geographical location of a wireless communication device. Some conventional techniques include using global positioning satellite (GPS) systems to determine the location where characteristics of signals received at the wireless communication device from multiple satellites in the GPS system are used to determine the device location. Some WWAN systems evaluate signals received at base stations from the wireless communication device to determine its location. For example, Advanced Forward Link Trilateration (AFLT) techniques are used by conventional WWANs to determine location. Some conventional positioning systems utilize combinations of satellite and base station information to determine position. Unfortunately, conventional techniques for determining device location are sometimes less then optimum. For example, GPS techniques require the wireless communication device to receive signals from at least three satellites to determine device location and where the wireless communication device is located in a building, tunnel or low area such as canyon or ravine, the location sometimes can not be determined. Further, AFLT systems require the wireless access device to be within the range of several base stations for an accurate determination of the device location. Therefore, the accuracy or ability to determine the location of a wireless communication device depends on the terrain, obstructions, and positions of systems components relative to the wireless communication device.

Accordingly, there is a need for an apparatus, system, and method for determining a geographical location of a wireless communication device.

SUMMARY

A wireless access point receives a reverse link (RL) wireless wide area network (WWAN) signal from a wireless communication device and forwards wireless local area network (WLAN) location information based on the received RL WWAN signal to a position determining entity (PDE). The PDE uses the WLAN location information and, in some cases, other location information to determine the geographical location of the wireless communication device. The WLAN location information is any information that at least assists the PDE in determining the geographical location of the wireless communication device and may include any combination of data related to signal strength of the WWAN RL signal, a propagation time of WWAN RL signal, a distance between the access point and the wireless access point, a geographical location of the access point, and/or a geographical location of the wireless communication device.

DETAILED DESCRIPTION

Figure 1:
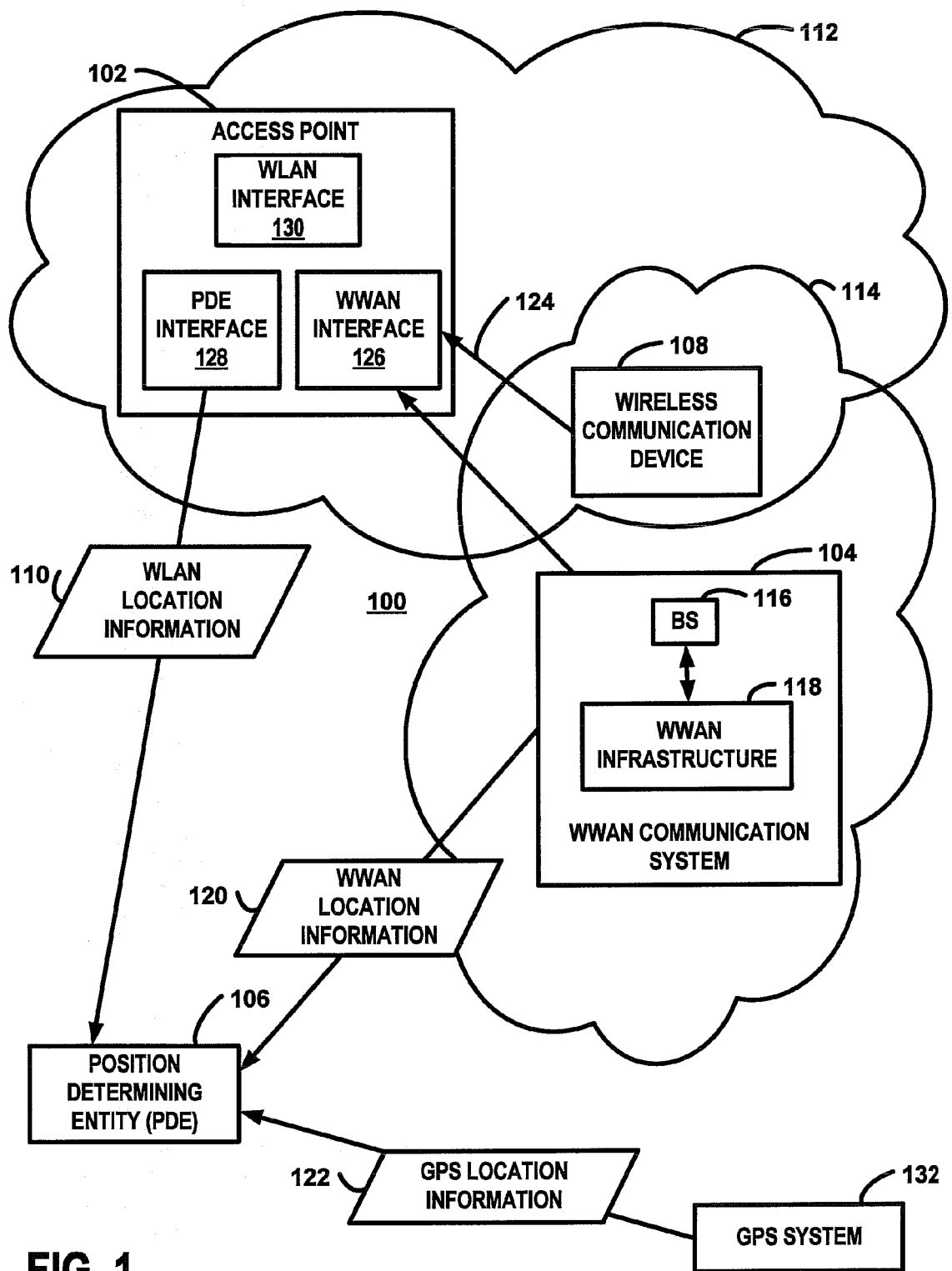
FIG. 1 is a block diagram of a communication network arrangement in accordance with the exemplary embodiment of the invention.

FIG. 1 is a block diagram of an access point 102 within a communication network arrangement 100 in accordance with the exemplary embodiment of the invention. The access point 102 communicates with a wireless wide area network (WWAN) communication system 104 and a position determining entity (PDE) 106 and provides wireless local area network (WLAN) service to WLAN communication devices (not shown in FIG. 1). The access point 102 monitors reverse link (RL) WWAN channels and, when a reverse link (RL) WWAN signal is intercepted from a wireless communication device 108, the access point 102 sends corresponding WLAN location information 110 to the PDE 106. As explained in further detail below, the PDE 106 determines a geographical location (position) of the wireless communication device 108 using at least the WLAN location information 110. The WLAN location information 110, therefore, is any data, parameter, or other information that provides information that can be used to calculate or otherwise determine the geographical location either solely or in combination with other information. The other location information may include Global Positioning Satellite (GPS) information and Advanced Forward Link Trilateration (AFLT) information, for example. In the exemplary embodiment, the WLAN location information includes a distance parameter indicating a distance between access point and the wireless communication device that is calculated by the access point 108. In some circumstances, however, another entity may calculate the distance. For example, the PDE may process WLAN location information that includes RL signal characteristics to calculate the distance between the access point and wireless access point.

Some of the wireless communication devices 108 may be multi-mode wireless communication devices that can communicate on the WLAN network 112 as well as on WWAN network 114 at least partially provided by the WWAN communication system 104. As described above, the term WWAN is used primarily to distinguish this group of diverse technologies from WLANs that typically have smaller service areas on the order of 100 to 300 feet per base station (access point). Accordingly, the WWAN communication system 104 is any system that provides wireless communication services within relatively large geographical areas as compared to WLANs. Examples of WWAN systems 104 include cellular communication systems that provide cellular communication services through at least one base station 116 connected to a WWAN infrastructure 118 such as a cellular system infrastructure (118). The WWAN infrastructure 118 may include one or more core networks that are connected to a global network such as Internet Protocol (IP) network or public switched telephone network (PSTN). In the exemplary embodiment, the WWAN communication system 104 operates using packet switching communication techniques. In such systems, the communication infrastructure is a packet switched core network and includes an access gateway for interfacing to WLANs 112 and PDEs 106 using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1X, 1xEV-DO, and W-CDMA. In some circumstances, the WWAN communication system 104 may operate with other standards such as OFDM based standards or GSM standards, for example. In the embodiment discussed below, the WWAN system 104 is an OFDM system that operates in accordance with IEEE 802.16(e) standards often referred to as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 118 may be performed by the base station 116, a base station controller, or the MSC in some circumstances.

The access point 102 is any device capable of providing wireless local area network (WLAN) services and that can send messages based on received WWAN signals to the position determining entity (PDE) 106. Although the access point 102 is a fixed access point that is connected through a wired backhaul to an IP network in the exemplary embodiment, the access point 102 may be a cellular mobile gateway that is connected through a cellular communication link, or other WWAN link, to the PDE 106. The access point 102 provides WLAN service to communication devices (not shown) within adequate range of the access point 102. An example of suitable technique for providing WLAN service includes operation in accordance with a WLAN protocol such as WiFi or any of the protocols defined in the IEEE 802.11 standards. Messages sent from the access point 102 to the WWAN infrastructure 118 may be sent using any combination of wired and/or wireless communication methods. In the exemplary embodiment, the access point 102 is connected to an access gateway in a core network and sends messages using packet switched data techniques, either through an IP network or through an access router. In some circumstances, messages can be sent from the access point 102 through a PSTN. In other circumstances, a transmitter may be used to wirelessly transmit the messages to the base station 116 which are then forwarded to the WWAN infrastructure 118 and other entities such as PDEs 106.

The wireless communication device 108 is any type of communication device that is capable of communicating within a WWAN system 104. The wireless communication device 108, sometimes referred to as an access terminal, may be a wireless modem, a personal digital assistant, cellular telephone, or other such device. As mentioned above, the wireless communication device 108 may be a multi-mode wireless communication device that is capable of communicating within one or more WLAN systems and within one or more WWAN systems.

The PDE 106 is any device or system that determines the geographical location (position) of the wireless communication device 108 based on at least the WLAN location information 110. In the exemplary embodiment, the PDE 106 includes a server computer connected to the Internet and can determine the geographical location of the wireless communication device 108 in accordance with conventional techniques utilizing systems such as GPS and ALFT. The PDE, therefore, uses any combination of WLAN location information 110, WWAN location information 120, and/or GPS system information 122 determine the geographical location. In some circumstances, the WWAN location information 120 includes GPS device data received at the WWAN communication system 104 from the wireless communication device 108. For example, where Assisted GPS (AGPS) systems are utilized, the wireless communication device 108 transmits GPS pseudorange information to the WWAN which is forwarded to the PDE 106. Messages and information may be processed or otherwise communicated through other entities, devices and systems not illustrated in FIG. 1. For example, in some situations, multiple PDEs are connected to a Mobile Position Center (MPC) which manages the position information and communications to WWAN communications systems 104.

The clouds shown in FIG. 1 symbolize networks and do not necessarily illustrate coverage areas of the networks 112, 114. For example, the geographical coverage area of the WWAN 114 may include one or more coverage areas of WLANs 112 provided by access points 102. Further, the coverage area of the WWAN 114 may have areas poor quality areas or areas where no WWAN service is available. The areas, however, may have good coverage from a WLAN 112. Such a scenario may occur where the WLAN coverage is within a building such as an office or home and the WWAN coverage is generally available in the area of the building but lacking within the building due to walls and other signal obstructions. Positioning techniques such as GPS and AFLT techniques may be limited in some areas where WLAN coverage is good. For example, GPS and AFLT performance may be severely degraded in a tunnel but WLAN information may be easily acquired where WLAN service is provided by access points 102 distributed within the tunnel.

In accordance with the exemplary embodiment, the access point 102 intercepts a reverse link (RL) WWAN signal 124 transmitted from the wireless communication device 108. The access point 102 sends WLAN location information 110 to the position determining entity (PDE) 106 based on the received RL WWAN signal 124 received from communication device 108. In the exemplary embodiment, the WLAN location information 110 is a calculated distance between the access point 102 and the wireless communication device 108. The WLAN location information 110, however, may be any measured, calculated, or processed parameter or data that conveys information related to the geographical location of the wireless communication device and is at least partially based on the RL WWAN signal 124 received at the access point 102. For example, the WLAN location information 110 may include any combination of signal phase information, signal amplitude, signal amplitude difference between the received amplitude and transmitted amplitude of the RL WWAN signal 124, frequency information, signal time delays, and/or geographical coordinates.

In addition to the WLAN location information 110 based on the RL signal, the access point 102 may send other information to the PDE 106 in some circumstances. For example, the access point 102 may send information identifying the wireless communication device 108, information identifying the access point 102, and/or information indicating a geographical location of the access point 102. In the exemplary embodiment, the access point 102 sends device identification information associated with the WLAN location information 110 that identifies the wireless communication device 108 that transmitted the RL WWAN signal 124.

Information from multiple access points may be processed by the PDE 106, or other entity, to determine the location of the wireless communication device 108. For example, several access points may send WLAN location information related to a particular wireless communication device to a WLAN controller that uses triangulation techniques to determine or estimate the device location. The location is then forwarded to the PDE 106 which may forward the location to a requesting entity or may further process the data and other information before sending a location to the requesting entity. As is known, the functions of a WLAN controller may be performed by selected access point within a WLAN 112. In some situations, an access point can send WWAN uplink measurements directly to the PDE allowing the PDE to use the information as one of the inputs to its position determination algorithms.

The PDE 106 may apply other location information 120, 122 received from other entities to improve the accuracy of the location before forwarding the location. In other circumstances, the PDE 106 may evaluate WLAN location information received from multiple access points where the WLAN location information is related to a particular communication device 108. Any of numerous weighting schemes may be used to rely on different location information when determining the geographical location of the wireless communication device. For example, AFLT information received from the WWAN system may be weighted relatively lower than the WLAN location information where signal strengths of a signals used for the AFLT measurements are low and the signal strength of the RL WWAN signal is high.

When the WWAN communication system 104 is providing wireless communication services to the communication device 108, the access point 102, at least periodically, monitors the WWAN reverse link channel used by the communication device 108 to transmit WWAN reverse link signals. In some cases, the access point 102 may employ procedures to detect wireless communication devices 108. The access point 102 maintains device information identifying the wireless communication devices 108 that should be monitored. Reverse link channel information for each device 108 is also maintained at the access point 102 and may be intercepted by the access point 102 on a forward link WWAN channel or may be provided to the access point 102 by the WWAN system 104 and/or PDE 106.

A WWAN interface 126 includes any combination of hardware, software and/or firmware sufficient to at least detect WWAN RL signals. In the exemplary embodiment, the WLAN interface 126 is also capable of receiving forward link (FL) WWAN signals transmitted from a base station 116. In some circumstances the WWAN interface 126 may also include a WWAN transmitter. The WWAN interface may also include a network interface for connecting to the WWAN infrastructure through an access router.

A PDE interface 128 includes any combination of hardware, software and/or firmware sufficient to at least send the WLAN location information 124 to the PDE 106. In the exemplary embodiment, the PDE 106 includes a network interface that facilitates communication through an IP network such as the Internet. The PDE interface 128, however, may include a wireless transceiver such as WWAN transceiver for communicating with the PDE 106 through a WWAN system 104.

A WLAN interface 130 includes any combination of hardware, software and/or firmware for communicating with one or more WLAN communication devices. As discussed below, the WLAN interface 130 includes a WLAN transmitter and a WLAN receiver and provides WLAN services in accordance with IEEE 802.11 protocol standards.

Figure 2:
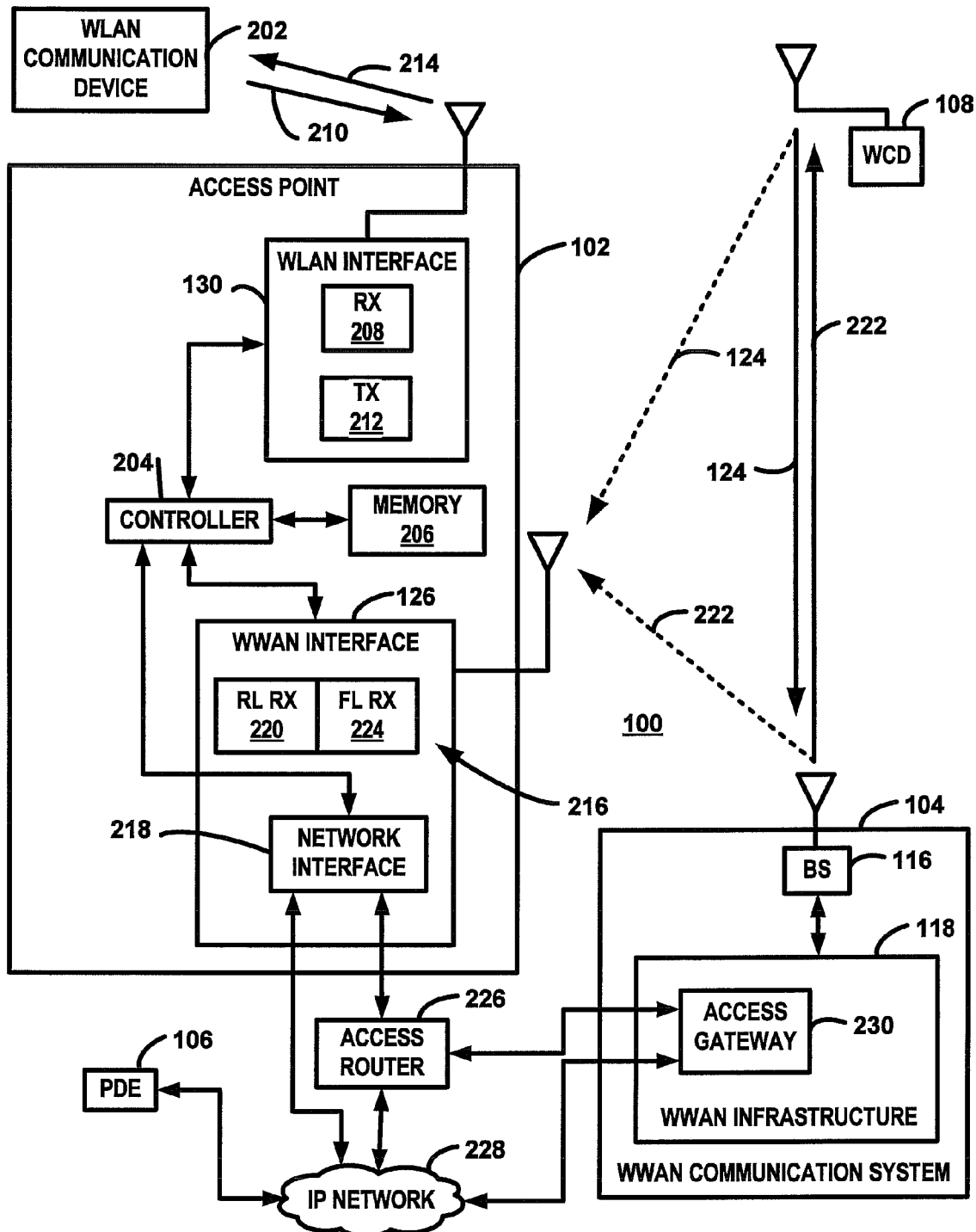
FIG. 2 is a block diagram of the communication network arrangement where the access point receives reverse link WWAN signals from the communication device.

FIG. 2 is a block diagram of the communication network arrangement 100 where the access point 102 receives reverse link (RL) WWAN signals 124 from the communication device 108. The access point 102 includes the WWAN interface 126 for communicating with the WWAN system 104 and the WLAN interface 130 for providing WLAN service to one or more WLAN communication devices 202. The access point 102 further comprises a controller 204 coupled to the WWAN interface 110 and the WLAN interface 122. The controller 204 performs the control functions described herein as well as performing other functions and facilitating the overall operation of the access point 102. The controller 204 is connected to, or includes, a memory 206 that may include one or more random access memory (RAM) and/or read only memory (ROM) memory devices. The WLAN interface 130 includes a WLAN receiver 208 for receiving reverse link (RL) WLAN signals 210 and a WLAN transmitter 212 for transmitting WLAN signals 214. The signals 210, 212 are transmitted and received in accordance with a WLAN protocol. Examples of a suitable WLAN protocols include protocols in accordance with the IEEE 802.11 protocol and wireless fidelity (WiFi). In some circumstances, the access point 102 may also include a wired LAN interface (not shown) for communicating with devices connected to the access point 102 through wires.

The WWAN interface 126 includes a WWAN receiver 216 that can be configured to at least receive reverse link WWAN signals 124 transmitted from a wireless communication device 108. In some situations, the WWAN interface 126 may also be configured to send the WLAN location information 110 to the WWAN infrastructure 118 through a network interface 218. In the exemplary embodiment, the WWAN receiver 216 can be configured as a reverse link WWAN receiver 220 for receiving reverse link WWAN signals 202 and as a forward link WWAN receiver 224 for receiving WWAN forward link signals 222 from a base station 116. In some circumstances, two separate WWAN receivers may be used to implement the WWAN reverse link and forward link receivers 220, 224. Also, in some implementations, the capability to receive WWAN forward link signals 222 may be omitted.

The network interface 218 exchanges messages with an access router 226 and an internet protocol (IP) network 228. The network interface 218 provides packet data communications and facilitates access to the Internet and to an access gateway 230 in the WWAN infrastructure 118 through the access router 226. In some circumstances, at least portions of the network interface 218 may be implemented separately from the WWAN interface 120. The access router 226 may be connected to several access points 102 and provides communication management and control functions to the WLAN. In some situations, the access router 226 may be implemented within an access point 102 or may be eliminated. In some circumstances, the connection between the access gateway 230 and the access point 102 may include a wireless communication link such as satellite communication link or point-to-point microwave link, for example.

In addition to other information, the memory 206 stores communication device identification values corresponding to each wireless communication device 108 for which WLAN location information has been requested. The memory 206 also stores identification information of WLAN communication devices 202 authorized to use the access point 102. The communication device identification value may include an electronic serial number (ESN) or other unique data.

The PDE interface 128 is formed by at least portions of the controller 204 and the network interface 218 in the exemplary embodiment. The network interface 218 facilitates communication through the IP network 228 to the PDE 106. The PDE interface 128, however, may include any combination of hardware, software, and/or firmware for communicating with the PDE 106. As explained above, for example, the PDE interface 128 may include a wireless transceiver such as WWAN transceiver 216 for providing the WLAN location information through the WWAN system 104.

The access point 102 monitors the reverse link WWAN channel(s) that may contain a reverse link WWAN signal 124 transmitted from a wireless communication device 108 identified by the communication device identification values. The reverse link WWAN receiver 220 is tuned, or otherwise configured, to receive the reverse link WWAN signals 124. Based on one or more received WWAN RL signals 124, the controller 204 determines the distance between the communication device 108 and the access point 102. An example of suitable technique for determining the distance includes evaluating a power level of the received RL WWAN signal. In some circumstances, the detection of a RL WWAN signal from the communication device 108 may be sufficient to determine that the communication device 108 is within a particular range. The controller 204 generates and sends the WLAN location information 110 based on the calculated distance. In the exemplary embodiment, therefore, the WLAN location information message includes a distance between the access point 102 and the wireless communication device 108. The distance may be calculated based on factors other than power level of the signal. For example, factors may include only the power level of the WWAN RL signal or on a factor based solely on the WWAN RL receiver's 220 ability to decode the incoming RL signal.

Any of several techniques may be used to determine the proximity of the communication device 108 based on the WWAN RL signal. In the exemplary embodiment discussed below in further detail, a forward link WWAN signal transmitted from the base station to the communication device 108 is intercepted by the access point 102 and decoded to determine reverse link scheduling information. Based on the difference in received power and transmitted power of the WWAN RL signal, the access point 102 determines the distance. The access point 102 may also determine distance based on the difference between the arrival time and transmission time of the WWAN RL signal. In another example, the access point 102 may determine that the communication device 108 sufficiently close to generate the WLAN location information message including a distance if the received power level is above a threshold without information regarding the transmission power level. Another example of a suitable technique of determining or estimating distance includes utilizing multiple antennas or smart antennas to determine the proximity of the communication device 108 to the access point 102 based on the reverse link WWAN signal transmitted by the communication device 108. For example, beam forming antennas may provide distance information to allow the controller to determine whether the communication device 108 is within the WLAN service area. Other techniques or combinations or techniques may be used.

In the exemplary embodiment, the WWAN infrastructure 118 comprises a packet switched core network that includes at least one access gateway 230. The access router 226 may be connected to the access gateway 230 using any combination of wired and wireless connections. Examples of suitable connections include T1 lines, fiber optic cable, coaxial cable, and point-to-point microwave. The access gateway 230 is a communication interface that allows the access point 102 to communicate with the WWAN infrastructure.

During operation, information regarding the power level is determined by intercepting the WWAN FL signals that contain reverse link scheduling information corresponding to each communication device 108 that is to be monitored. In the exemplary embodiment, information is extracted from the UL MAP transmitted in the WWAN FL signal. In some circumstances, information regarding the RL transmissions of communication devices 108 to be monitored may be directly provided to the access point by the WWAN 104 through a network connection. The controller 202 maintains a frequency and timing information for reverse link transmission for each communication device associated with each stored identification value. Also, signal timing information extracted from the forward link WWAN signal may be used to calculate a WWAN RL signal propagation time of the WWAN RL signal and, therefore, the proximity of the communication device 108. In the exemplary embodiment where the WWAN system is an OFDMA system, communication device transmission power level is the same for each communication device 108 unless adjusted by the OFDMA system. During system initialization of the access points, the default power level is stored in memory 206. Any adjustments to the transmission power level for a particular communication device 108 are forwarded to the access point 102 and updated in memory 206. In some circumstances, transmission power level updates may not be available and the access point uses the default values for proximity calculations. The access point 102 determines the distance or a distance estimate based on the measured propagation loss of the transmitted reverse link signal and propagation time. In some situations, a combination of propagation time, propagation loss, and other parameters may be used to determine the distance.

After determining the distance of the communication device 108 to the access point 102, the controller 202 generates a WLAN location information message identifying the communication device 108 and the distance to the communication device 108. The message (110) is sent to the WWAN communication system 104 either through the access router 226 or through the IP network 228.

The WLAN location information message (110) includes at least information identifying the communication device 108 and that provides data that can be used to determine the geographical location of the communication device 108. The WLAN location information message (110), however, may include additional information such, for example, information identifying the access point 102, received signal strength of the WWAN RL signal, a transmission power level of the RL WWAN signal, propagation loss of the RL WWAN signal, a propagation time of WWAN RL signal, access point identification, a geographical location of the access point, a geographical location of the wireless communication device, and any suitable combination of the foregoing. Access point identification information may include a SSID of the access point 102. Further, the WLAN location information message (110) may contain security protocol that assists the core network in identifying the access point 102.

Figure 3:
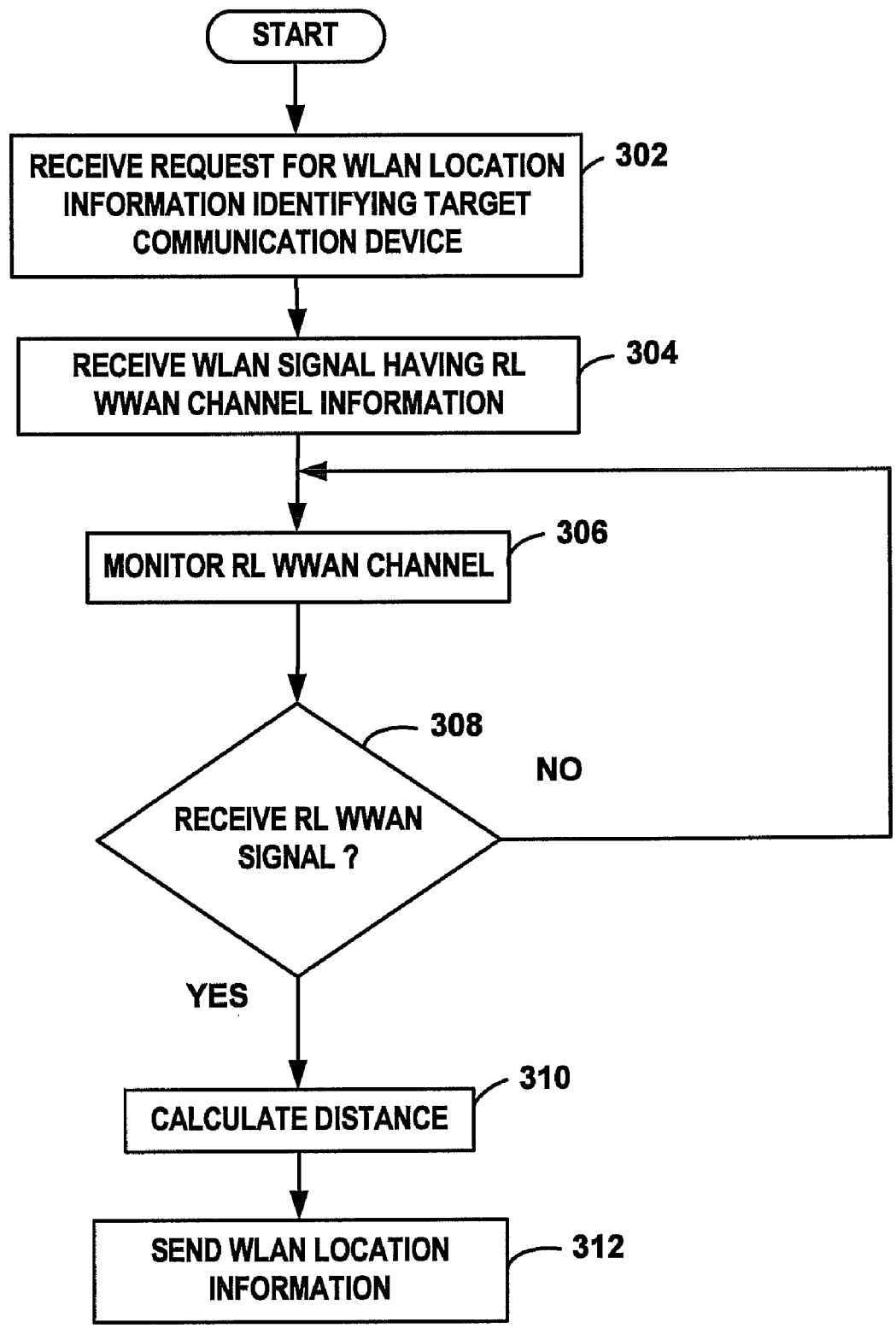
FIG. 3 is a flow chart of a method of providing wireless location area network (WLAN) location information to a position determining entity (PDE) in accordance with the exemplary embodiment.

FIG. 3 is flow chart of a method of acquiring WLAN location information at an access point in accordance with the exemplary embodiment. The order of the steps discussed below may be varied and one or more steps may be performed simultaneously in some circumstances. In the exemplary embodiment, the method is performed, at least in part, by executing code on the controller 204 in the access point 102.

At step 302, a request for WLAN location information for a target WWAN wireless communication device 108 is received. The request identifies the wireless communication device 108. Device identification may include a serial number of the device 108. In some situations, the request may include reverse link channel information and/or forward link channel information for the device 108. The request may be received from a PDE or from a WWAN. In the exemplary embodiment, an application or service running on the WWAN 104 initiates the request by providing the appropriate access points with device identification information. Since the WWAN is aware of the general location of the wireless communication device 108 and the locations of the access points 102, the WWAN system identifies the access points within the general vicinity of the wireless communication device 108 and forwards identification information and/or reverse link channel information for the identified devices 108. The information is interpreted by the access point as a request to provide WLAN location information. Examples of services and applications running on the WWAN include the continual maintaining of device positions required for emergency services (E911) and location-based map services. The WLAN location information request can be initiated by the PDE in some circumstances when an application requests device position from the PDE.

At step 304, the access point monitors that WWAN forward link (FL) channels to receive reverse link (RL) channel information for the target communication device 108. The access point monitors the FL channels and detects messages transmitted to the target device 108 based on the device identification provided in step 302.

At step 306, the WWAN reverse link (RL) channel is monitored. In the exemplary embodiment, the WWAN RL receiver 220 is tuned to decode any WWAN RL signals 222 transmitted from any of the communication devices 108 in the list of target devices. The list is maintained in memory and updated in accordance with received requests for WLAN location information. The reverse link scheduling information enables more efficient RL monitoring. The access point 102 may detect communication devices 108 that are not in the target list but will not be able to decode the signals without identification information. In some circumstances, however, the WWAN RL receiver 220 may be configured to monitor all RL channels.

At step 308, it is determined whether the WWAN RL receiver 220 has received a WWAN RL signal. In the exemplary embodiment, the controller 204 determines whether a WWAN RL signal has been received from a communication device listed in the target list. If a WWAN RL signal has been received, the method continues at step 310. Otherwise, the method returns to step 306 to continue monitoring the WWAN RL channels.

At step 310, the distance between the communication device 108 and the access point 102 is calculated. The proximity calculation may be based on any number of parameters or characteristics of the received WWAN RL signal as well as other factors. Examples of suitable parameters include parameters related to signal power level and a timing offset between a transmission and reception times. Other related factors may include transmission power level, location of one or more WWAN base stations and information extracted from WWAN RL signals and WWAN FL signals such as time stamps, power level indicators, and power control indicators. In some circumstances, the proximity is based only on a detection of the WWAN RL signal. The particular factors and calculation techniques depend on the type of WWAN communication system 104. An exemplary technique suitable for an OFDM based system IEEE 802.16 is discussed with reference to FIG. 5 below.

At step 312, WLAN location information 110 is sent to the PDE 106. In the exemplary embodiment, a message is transmitted by the PDE interface 128 through either the IP network 228 or through the access router 226 to the PDE 106. The access point 102 may transmit the message using other techniques. In some circumstances, for example, the message may be transmitted through a WWAN RL channel to the base station 116 and forwarded to the PDE 106 through the WWAN infrastructure 118. Further, the WLAN location maybe transmitted to the WWAN 104 through the IP network 228.

Figure 4:
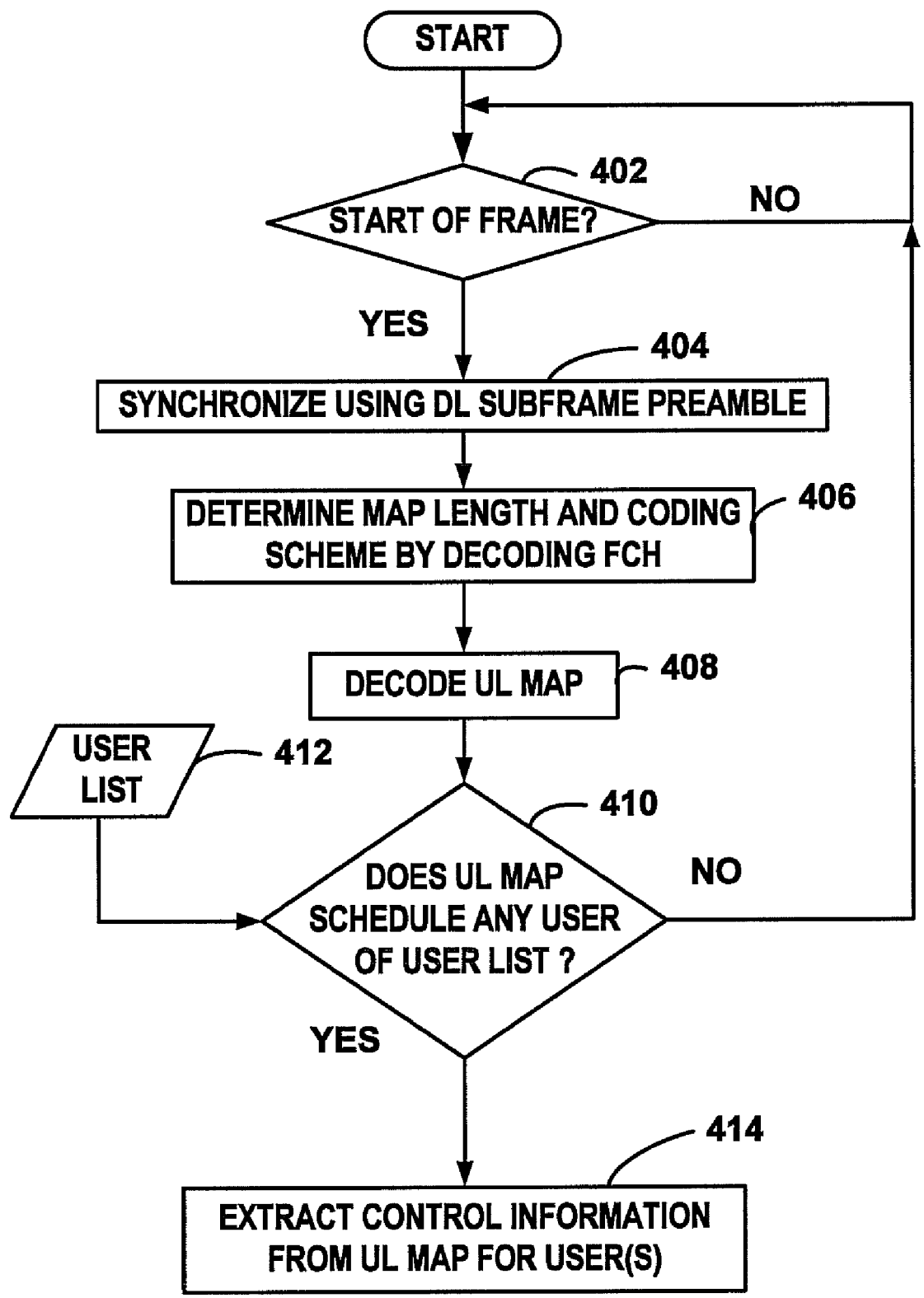
FIG. 4 is a flow chart of a method of monitoring a WWAN FL channel at an access point where the WWAN system operates in accordance with in accordance with the IEEE 802.16 standard.

FIG. 4 is a flow chart of a method of monitoring a WWAN FL channel at an access point 102 where the WWAN system 104 operates in accordance with OFDM techniques. The exemplary method operates within an OFDMA system that functions in accordance with IEEE 802.16(e) protocols. The method described with reference to FIG. 4 is an example of suitable technique for acquiring information that allows the access point 102 to monitor the reverse link WWAN channels. As discussed with reference to FIG. 4 and FIG. 5, the forward link (FL) WWAN signal and WWAN FL channel are referred to as downlink (DL) signals and downlink (DL) channels and correspond to communications from an OFDMA base station, sometimes referred to as an access node (AN), to the communication device 108. As discussed with reference to FIG. 4 and FIG. 5, reverse link (RL) WWAN signals and WWAN RL channels are referred to as uplink (UL) signals and uplink (UL) channels and correspond to communications from the communication device 108 to the OFDMA base station. As is known, IEEE 802.16(e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each communication device 108 is assigned a specific set of frequencies for receiving respective data packets. Each communication device 108 is also assigned a set of frequencies for transmitting in the UL.

At step 402, the controller 202 locates the start of a DL frame. When the start of the frame is found, the method continues at step 404. Otherwise, the step 402 is repeated.

At step 404, the WWAN FL receiver 226 acquires and synchronizes to the incoming signal using the DL sub-frame preamble. The WWAN FL receiver 226, therefore, performs the functions of a DL receiver in the exemplary method.

At step 406, the Frame Control Header (FCH) is decoded to determine the DL data burst length and coding scheme. In the exemplary method, the FCH burst is followed by the preamble. In networks operating in accordance with IEEE 802.16 standards, an uplink map (UL MAP) is a Medium Access Control (MAC) message that defines burst start times and frequencies on the UL channels for each communication device 108.

At step 408, the UL MAP is decoded. Accordingly, the received DL signals provides information in the UL MAP that allows the controller 202 to determine the timing of UL signals and carrier frequencies assigned to the communication device 108. In addition, the UL MAP includes user identification (ID) information corresponding to communication devices that are receiving the DL signals from the base station (access node).

At step 410, it is determined whether one or more of the communication devices listed in a user list 412 at the access point 102 are contained in the UL MAP. The user list 412 includes identification information that uniquely identifies communication devices that are supported by the access point 102. For example, the IEEE 802.16(e) standard uses manufacturer-issued X.509 digital certificates to identify devices. The user list 412 is typically programmed at the time of installation of the access point 102 and may be modified to add or remove user IDs. The users may be members of a household that reside where the access point 102 is installed. If no user IDs in the user list are contained in the UL MAP, the method returns to step 402. Otherwise, the method continues at step 414. In some circumstances, the UL MAP may not contain an explicit identification number and may include indirect identification information that can be used to determine the identity of the communication device 108.

At step 414, the control information for all of identified users is extracted from the UL MAP or other control messages. The control information is the transmission RL control information that includes a RL transmission power level and a RL transmission time for the WWAN RL signals transmitted by the communication devices 108. The timing information corresponding to the identified communication device is extracted from the decoded UL MAP and stored in memory.

Figure 5:
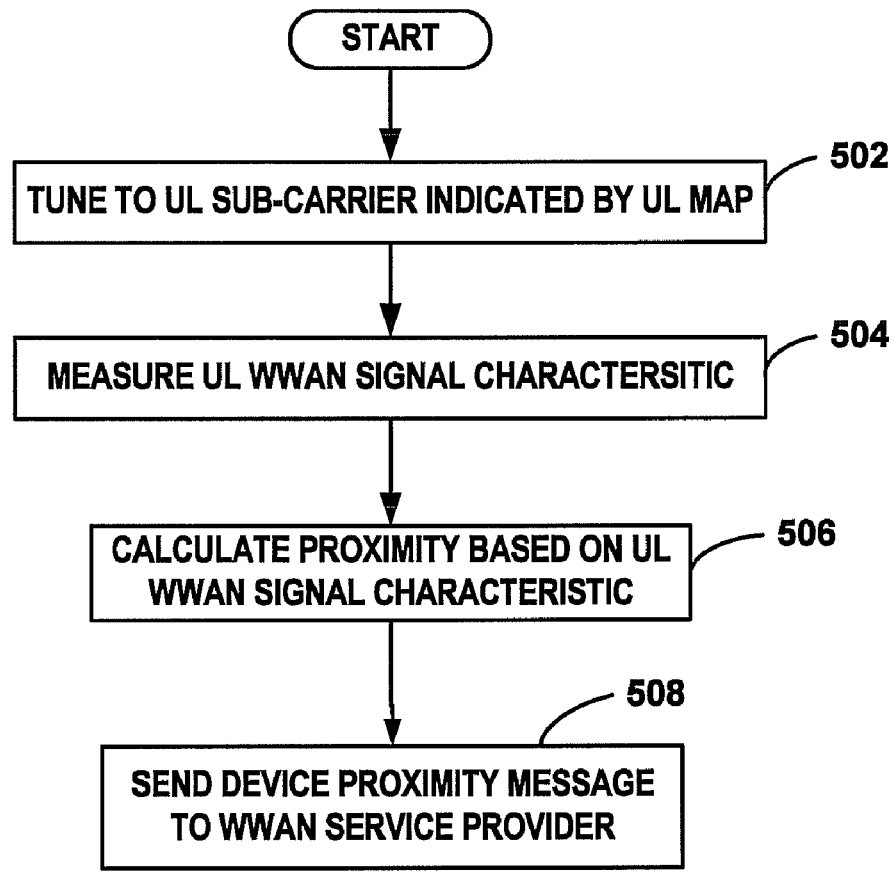
FIG. 5 is a flow chart of method of providing wireless location area network (WLAN) location information to a position determining entity (PDE) where the WWAN system operates in accordance with the IEEE 802.16 standard.

FIG. 5 is a flow chart of an exemplary method of managing wireless resources where the WWAN system 104 operates in accordance with OFDMA based system such as IEEE 802.16 (e) The exemplary method is performed by the access point 102 and includes monitoring a WWAN RL channel and initiating an acquisition of WLAN service to the communication device 108 based on a received WWAN RL signal. As explained above, the WWAN RL signals and WWAN RL channels are referred to as UL signals and UL channels with reference to FIG. 5. Using the information determined with the method discussed with reference to FIG. 4, the access point 102 monitors the UL WWAN channel and sends a WLAN location information. Accordingly, steps 502-508 provide an exemplary technique for performing steps 304-312 discussed with reference to FIG. 3 above.

At step 502, the WWAN receiver 216 is tuned to the UL sub-carrier frequency indicated by the UL map. The UL sub-carrier frequency extracted in step 414 is used to tune the WWAN RL receiver 224. In some situations, a single receiver may be tuned to both uplink and downlink frequencies. In the exemplary embodiment, the receiver 216 can simultaneously receive UL and DL signals.

At step 504, the characteristics of the received UL WWAN signal is measured. In the exemplary embodiment, the controller 204 determines the power level and the reception time of the received UL signal. In some situations only the reception time or the power level is determined. Using known techniques, the power of the received UL WWAN signal is measured and stored in memory. The reception time is determined relative to the system time and stored in memory. Other signal characteristics may be determined in some circumstances where the signal characteristics provide information regarding the proximity of the communication device 108 to the access point 102. In the exemplary embodiment, the identification information is used to identify the communication device 108 only and not to decode the signals in order to minimize cost. In some implementations, however, the identification information may be used to decode the WWAN RL signals.

At step 506, the controller 204 calculates the proximity of the communication device 108 transmitting the UL signal to the access point 102. Based on the characteristics of the UL signal, the controller 204 determines the distance from the access point 102 to the communication device 108. Using the transmission time of the WWAN UL signal determined from the UL MAP and reception time, the controller 204 calculates a propagation time of the signal. The propagation attenuation of the signals is determined by calculation the difference between the transmission power and the reception power. Using either or both of the propagation parameters, the controller 204 calculates the distance between the communication device 108 and the access point 102. For example, the distance may be determined by multiplying the propagation time by the speed of light. The distance may also be calculated by comparing the propagation loss to a known propagation loss per distance function for the antennas. The distance values may be averaged or otherwise processed to determine the proximity.

At step 508, a WLAN location information message 110 is sent to the PDE 106. The message includes information that when interpreted by the PDE 106 provides at least some information that allows the PDE 106 to calculate the geographical location of the wireless communication device 108. Accordingly, step 508 provides an exemplary technique of performing step 312 where the WWAN communication system 104 operates in accordance with IEEE 802.16(e) standards.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A position determining entity (PDE) for determining a geographical position of a wireless communication device capable of communicating within at least a wireless wide area network (WWAN), the PDE comprising:
a processor configured to determine the geographical position based on wireless local area network (WLAN) location information related to a WWAN reverse link (RL) signal received from the wireless communication device at an access point of a wireless local area network (WLAN).

2. The PDE of claim 1, further comprising an interface configured to receive the WLAN location information from the WLAN.

3. The PDE of claim 2, wherein the WLAN location information is selected from the group comprising a signal strength of the WWAN RL signal, a propagation time of WWAN RL signal, a distance between the access point and the wireless access point, a geographical location of the access point, a geographical location of the wireless communication device, and any suitable combination of the foregoing.

4. The PDE of claim 2, wherein the WLAN location information is associated with a plurality of WWAN RL signals received from the wireless communication device at a plurality of access points of the WLAN.

5. The PDE of claim 1, wherein the processor is further configured to determine the geographical position based on WWAN location information received from the WWAN.

6. The PDE of claim 5, wherein the location information comprises Advanced Forward Link Trilateration (AFLT) data acquired by the WWAN.

7. The PDE of claim 5, wherein the WWAN position information comprises global positioning satellite (GPS) data.

8. The PDE of claim 7, wherein GPS data is based on device GPS data received at the WWAN from the wireless communication device.

9. The PDE of claim 8, wherein the processor is further configured to determine the geographical position based on GPS location information received from a GPS system.

10. An access point comprising:
a wireless wide area network (WWAN) receiver configured to receive a reverse link (RL) WWAN signal from a wireless communication device; and
a position determining entity (PDE) interface configured to send wireless local area network (WLAN) location information corresponding to the RL WWAN signal to a PDE, the WLAN location information related to the RL WWAN signal and to a geographical location of the wireless communication device.

11. The access point of claim 10, wherein the WLAN location information is selected from the group comprising a signal strength of the WWAN RL signal, a propagation time of WWAN RL signal, a distance between the access point and the wireless access point, a geographical location of the access point, a geographical location of the wireless communication device, and any suitable combination of the foregoing.

12. The access point of claim 10, wherein the PDE interface comprises an Internet interface configured to send packet data in accordance with Internet Protocol (IP) to the PDE.

13. A method of determining a geographical location of a wireless communication device, the method comprising:
receiving, at a wireless local area network (WLAN) access point, a reverse link (RL) wireless wide area network (WWAN) signal from a wireless communication device;
generating, based on the RL WWAN signal, WLAN location information at least partially indicative of a geographical location of the wireless communication device; and
sending the WLAN location information to a position determining entity (PDE).

14. The method of claim 13, wherein the WLAN location information is selected from the group comprising a signal strength of the WWAN RL signal, a propagation time of WWAN RL signal, a distance between the access point and the wireless access point, a geographical location of the access point, a geographical location of the wireless communication device, and any suitable combination of the foregoing.

15. The method of claim 13, further comprising determining the geographical location based on the WLAN location information and other location information.

16. The method of claim 15, wherein the other location information comprises WWAN location information received from a WWAN.

17. The method of claim 16, wherein the WWAN location information comprises Advanced Forward Link Trilateration (AFLT) data acquired by the WWAN.

18. The method of claim 16, wherein the WWAN location information comprises assisted global position satellite (aGPS) data received from the wireless communication device.

19. The method of claim 18, wherein the other location information comprises GPS system data received from a GPS system.

20. The method of claim 15, wherein the other location information comprises GPS system data received from a GPS system.

21. The method of claim 13, further comprising:
receiving a request for WLAN location information identifying the wireless communication device.

22. The method of claim 21, further comprising:
receiving a forward link (FL) wireless wide area network (WWAN) signal to detect messages transmitted to the identified wireless communication device.

* * * * *